(12) United States Patent
Vago et al.

(10) Patent No.: US 10,458,571 B2
(45) Date of Patent: Oct. 29, 2019

(54) SEALING DEVICE FOR A STEM OF A VALVE

(71) Applicant: TRUFLO RONA, S. R. L., Milan (IT)

(72) Inventors: Antonello Vago, Cermenate (IT); Dino Zuccarelli, Viguzzolo (IT)

(73) Assignee: TRUFLO RONA, S.R.L., Milan (IT)

( * ) Notice: Subject to any disclaimer, the term of this patent is extended or adjusted under 35 U.S.C. 154(b) by 206 days.

(21) Appl. No.: 15/489,961

(22) Filed: Apr. 18, 2017

(65) Prior Publication Data

US 2017/0299087 A1 Oct. 19, 2017

(30) Foreign Application Priority Data

Apr. 19, 2016 (IT) .................. 102016000040256

(51) Int. Cl.
| | |
|---|---|
| *F16K 41/02* | (2006.01) |
| *F16K 27/02* | (2006.01) |
| *F16K 41/08* | (2006.01) |
| *F16J 15/08* | (2006.01) |
| *F16J 15/3212* | (2016.01) |
| *F16J 15/3236* | (2016.01) |

(52) U.S. Cl.
CPC .......... *F16K 41/02* (2013.01); *F16J 15/0887* (2013.01); *F16J 15/3212* (2013.01); *F16J 15/3236* (2013.01); *F16K 27/02* (2013.01); *F16K 41/083* (2013.01)

(58) Field of Classification Search
CPC ...................... F16K 41/02; F16K 27/02; F16K 41/023–41/086; F16J 15/3236; F16J 14/312; F16J 15/0887
See application file for complete search history.

(56) References Cited

U.S. PATENT DOCUMENTS

| | | | | |
|---|---|---|---|---|
| 954,195 | A * | 4/1910 | Law .......................... | F16J 15/20 |
| | | | | 277/530 |
| 4,899,980 | A * | 2/1990 | Kemp .................. | F16K 5/0668 |
| | | | | 251/174 |
| 5,364,111 | A * | 11/1994 | Wunsch ............... | F16J 15/3208 |
| | | | | 277/532 |
| 5,368,312 | A * | 11/1994 | Voit ....................... | F16J 15/164 |
| | | | | 277/553 |
| 6,502,833 | B1 * | 1/2003 | Shibata ................ | F16J 15/0887 |
| | | | | 277/647 |
| 6,932,318 | B2 * | 8/2005 | Igarashi .............. | F16K 31/1221 |
| | | | | 251/60 |

(Continued)

*Primary Examiner* — Michael R Reid
(74) *Attorney, Agent, or Firm* — R. Ruschena Patent Agent, LLC

(57) ABSTRACT

A sealing device (1) for a stem (12) of a valve (10) comprising a metal gasket (4) for the valve (10) stem (12), shaped as a half "U" provided with a single sealing lip (44), which has a radially inner surface (442) and a radially outer surface (444), inclined along the radially inner direction, a wedge metal ring (6) positioned inside the half "U" of the metal gasket (4), an elastic element (7) configured to cooperate with said wedge metal ring (6), the elastic element providing the wedge metal ring with an elastic load and a static sealing ring (8). The elastic element (7) is configured for applying a force to the wedge metal ring (6) such that said wedge metal ring (6) applies a contact pressure to the sole sealing lip (44) of the metal gasket (4) shaped as a half "U".

14 Claims, 2 Drawing Sheets

(56) References Cited

U.S. PATENT DOCUMENTS

| | | | |
|---|---|---|---|
| 7,428,912 B2 * | 9/2008 | Pozzati | F16J 15/3212 137/375 |
| 2007/0175627 A1 * | 8/2007 | Pippert | E21B 33/08 166/88.1 |

* cited by examiner

SEALING DEVICE FOR A STEM OF A VALVE

BACKGROUND OF THE INVENTION

1. Field of the Invention

The present invention relates to a sealing device for a stem of a valve. In particular, the present invention relates to an improvement in A metal-to-metal seal between the valve stem and the valve body and to the particular configuration of the entire sealing device.

The sealing device for the valve stem, according to the present invention is particularly suitable for subsea applications, for example depth drilling for oil and gas. However, the present invention can also be used as a sealing device for other fluids, such as water and liquid or gaseous hydrocarbons, and for other applications.

2. Brief Description of the Prior Art

The exploitation of subsea oil and gas reserves has increased the demand for sealing devices for subsea applications which are sealed in order to prevent any loss of oil and gas, are reliable and durable. In fact, on one hand the components of such sealing device must be sealed in order to follow the increasingly stringent requirements of "zero emission" of oil or gas towards the surrounding environment. On the other hand, such components must withstand continuous loads of great intensity and taking into account that, due to the complex realizations of subsea structures, the maintenance operations are very problematic and expensive if not virtually impossible, the components must therefore be extremely reliable and have a long life with no defects or performance drop.

Valve sealing devices for subsea applications in the field of oil and gas according to the known art do not have adequate sealing performance when subjected to high pressures. In particular, the metal surfaces are subject to wear and the seal as a whole becomes less reliable and its operating life is shortened, so making necessary maintenance and repair operations.

A known solution is disclosed in EP 1819956A1. In fact, such document discloses a metal valve stem seal and the corresponding sealing device comprising a valve body, a metal valve stem housed within the valve body, a cover element also housed inside the valve body, a "U"-shaped gasket positioned between the metal stem and the cover element. The gasket has a first lip member and a second lip member each having an inner surface and an outer surface. A metal ring of a conical shape is mounted between the first and second lip whereas an energizing spring adjacent the conical ring applies a sufficient force to the conical ring in such a way that the same applies a sufficient contact pressure to the two lips to form a seal between the gasket and the metal valve stem and a seal between the gasket and the cover element. Such device, in order to be reliable and of long duration requires that the two sealing surfaces do not vary over time, as the variation of one of the sealing surfaces, for example due to wear between the contacting surfaces, adversely affects the good operation even of the other sealing surface by varying the forces applied from the same, and then the amplitude of the contacting surfaces. Therefore, such a solution is not reliable over time and also requires very expensive materials and surface treatments.

There is a need, therefore, to improve the known solutions and develop a sealing device which ensures at the same time high sealing performance, reliability and long operational activity.

SUMMARY OF THE INVENTION

Purpose of the present invention is to provide a sealing device for a stem of a valve, which is free from the drawbacks described above. In particular, such sealing device comprises a metal gasket for the valve stem, shaped as a half "U" and provided of a single sealing lip, a wedge metal ring positioned inside the half "U" of the metal gasket, an elastic element and a static sealing ring, made of a suitable material depending on its application (e.g., a metal, polymeric or elastomeric ring). The sealing device is characterized by the fact that the wedge ring applies a contact pressure just to the single lip of the gasket shaped as a half "U". In this way the contact pressure forces the lower portion of the lip to perform a rotation towards the outside by forming a sealing surface between the lip and the outer surface of the valve stem.

According to the present invention a sealing device for a stem of a valve is thus described, which has the characteristics set forth in the appended independent claim.

Further preferred and/or particularly advantageous embodiments of the invention, are described according to the characteristics set forth in the appended dependent claims.

BRIEF DESCRIPTION OF THE DRAWINGS

The invention will now be described with reference to the accompanying drawings, which illustrate some of its non-limiting embodiments, in which.

DETAILED DESCRIPTION OF THE PREFERRED EMBODIMENTS

Figure 1:
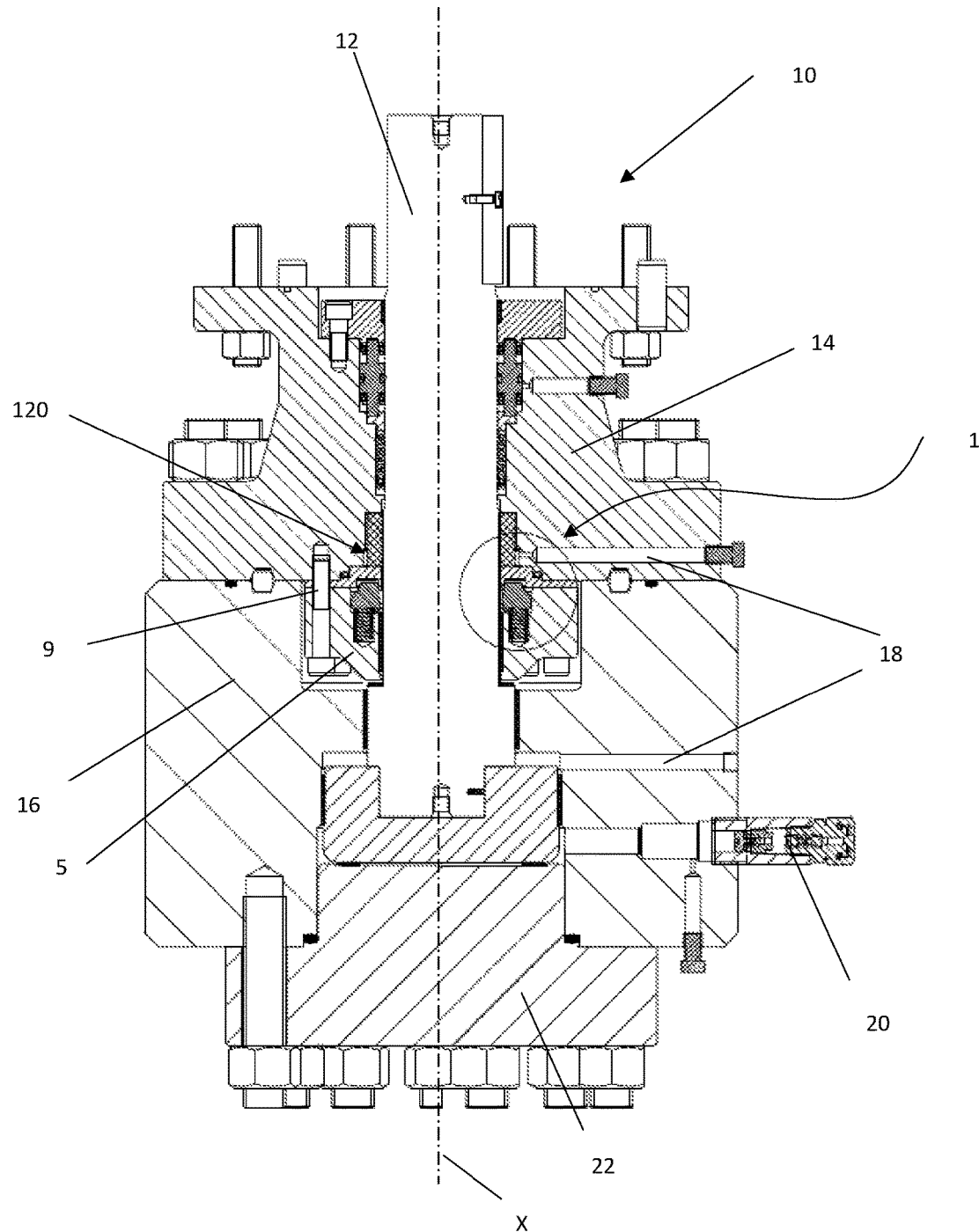
FIG. 1 is an axially symmetric sectional view of a valve provided with a sealing device, according to a preferred embodiment of the invention.
Figure 2:
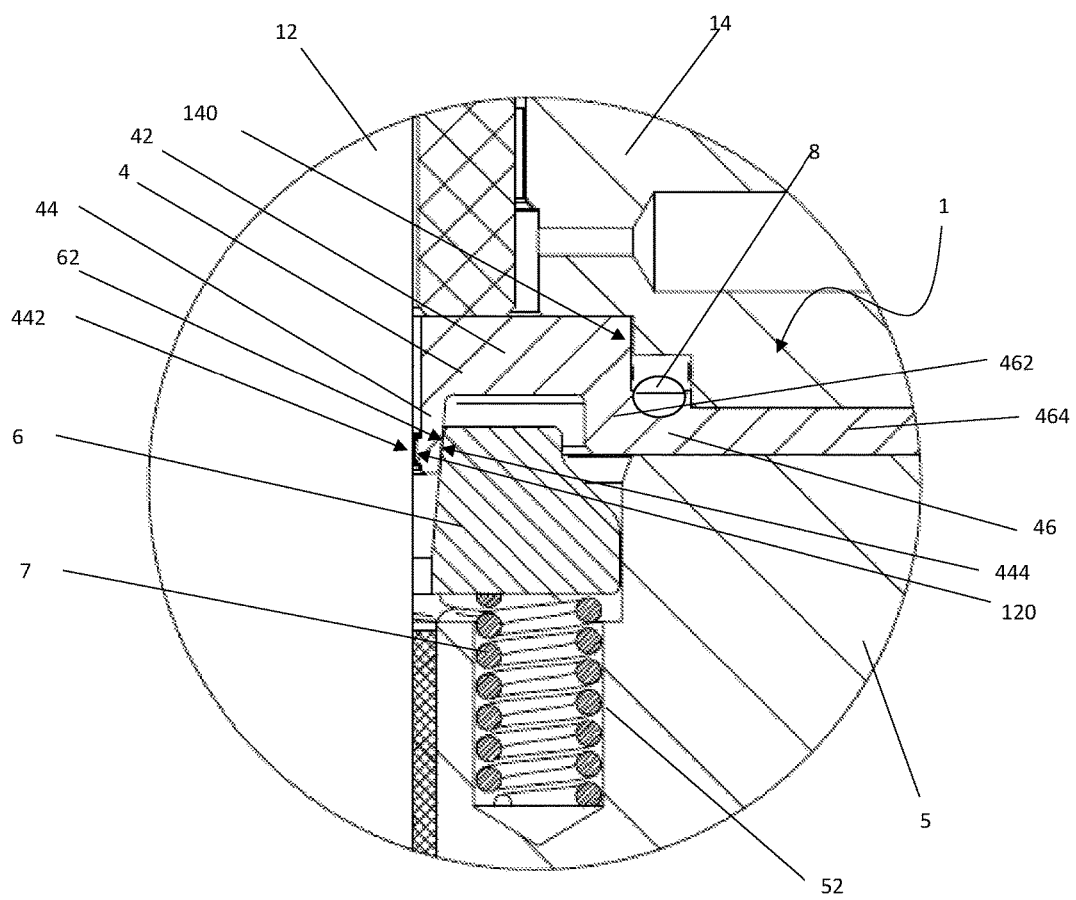
FIG. 2 is a detailed view of FIG. 1 on an enlarged scale, showing the sealing device of the previous Figure.

With reference to the aforesaid Figures, a sealing device 1 for a stem 12 of a valve 10 is shown in its entirety in the section of FIG. 1 and in more detail with an enlarged scale of FIG. 2.

Throughout the present description and in the claims, terms and expressions indicating positions and orientations such as "radial" and "axial" or "radially outer" and "radially inner" are intended to refer to the axis X of the valve 10.

The sealing device 1 is preferably made of steel or other alloys with high strength and anti-corrosion characteristics, such as stainless steels, nickel-based alloys or titanium-based alloys. Preferably, the device does not contain components made of plastic material or elastomer (possibly with the except of the static ring which will be described below), as the components subject to high loads have greater reliability and useful life if made of metallic material.

As shown in FIG. 1, the valve 10 for subsea applications comprises a movable metal stem 12 sliding within a lower valve body 14 and an upper valve body 16. The stem 12 of the valve is made of metallic material and is preferably provided with a surface coating on its radially outer surface 120. The surface coating is based on very hard alloys, such as alloys based on tungsten carbide or chromium carbide, or it can be a CVD coating (an acronym for ChemicalVapour-Deposition) or PVD (an acronym for PhysicalVaporDeposition). The movement of the stem is a rotation in the example shown in FIG. 1, but the principle of operation of the sealing device, as will be explained in the following, is also equally valid if the valve stem makes another kind of movement, for example performing a linear motion.

In the upper valve body 16 and the lower valve body 14 hydraulic or pneumatic means 18 can be provided for the valve stem actuation, as well as actuating means 20.

Finally, the valve can comprise a closure cap 22 firmly connected to the upper valve body 16, as well as further standard components therefore not shown in the Figure or not mentioned in the present description.

As shown in FIG. 2, the sealing device 1 comprises a metal gasket 4 for the stem 12 of the valve 10, shaped as a half "U". The metal gasket 4 is positioned in radial direction between the radially outer surface 120 of the valve stem 12 and the radially inner surface 140 of the lower valve body 14. In the axial direction, the metal gasket 4 is instead accommodated between the lower valve body 14 and a plate 5 housing an elastic element, as will be explained below. The half "U"-shaped metal gasket 4 is provided with a base portion 42, a sealing lip 44 (the radially inner side of the half "U") and with a shaped edge 46 forming a first portion 462 of the second side of the half "U" (which is radially outer and shorter than the first side) whereas a second portion 464 of the same shaped edge extends in a radially outer direction between the lower valve body 14 and the plate 5.

The sealing lip 44 has a radially inner surface 442 and a radially outer surface 444, which is inclined according to the radially inner direction. The shape of the lip member is adapted to ensure that, when the contact pressure is applied to the lip member itself, it can rotate in a radially inner direction by creating an tight seal and increasing the contact area.

The sealing lip 44 can be coated on the radially inner surface 442 with an alloy coating selected from the group of alloys comprising preferably tungsten carbides and chromium carbides or a PVD or CVD coating. However, also other suitable alloys can be used. Such alloy coating is advantageous due to its extreme resistance to abrasion and wear. In order to achieve a tight sealing throughout the useful life of the sealing device, both the radially inner surface of the sealing lip 44 and the radially outer surface 120 of the stem 12 of the valve 10 are preferably coated with the same alloy and in any case with a suitable alloy which must resist both a chemical attack and a strong wear, by ensuring at the same time that any possible escape route and/or possibility of corrosion are excluded between the contact areas of the two mating surfaces. The sealing lip 44 is coupled by interference against the respective surface of the stem 12 of the valve 10 in order to reach a tight seal, which of course does not affect the movement of the stem 12 of the valve 10.

As shown in FIG. 2, the sealing device 1 according to the invention, further comprises a wedge ring 6. The wedge ring has the function of providing the expansion force to the single sealing lip 44 of the metal gasket 4. The wedge ring 6 is made of metal, preferably selected from the group consisting of high mechanical and corrosion resistance alloys, such as stainless steels, alloys based on nickel, titanium and/or similar.

The wedge metal ring 6 is housed inside the metal gasket 4 of the stem 12, between the sealing lip 44 and the shaped edge 46. In particular, the radially inner surface 62, which is placed laterally and inclined, of the wedge metal ring 6 is in contact against the radially outer surface 444 of the sealing lip 44. Therefore the wedge metal ring 6 forms a tight seal with the metal gasket 4 of the stem 12.

The sealing device 1 further comprises at least one elastic element 7 axially positioned between the wedge-metal ring 6 and a seat 52 of the plate 5. The elastic element 7 preferably is either a helical spring or a "Belleville" spring and is made of a metal, preferably selected from the group consisting of corrosion-resistant alloys. The sealing device 1 according to the invention is provided with at least one elastic element, although a greater number may be present depending on the needs. The elastic element 7 applies to the wedge metal ring 6 a sufficient force so that the latter can apply a sufficient contact pressure to the sealing lip 44.

The sealing device 1 also comprises a static sealing ring 8, for example a metal C-shaped ring, which is axially positioned between the lower valve body 14 and the shaped edge 46 of the metal gasket 4. The function of such static gasket is to ensure a static seal against the fluid (oil or gas).

Hence, the solution according to the present invention solves the technical problem related to the complex operation of a double metal seal, for example a metal gasket with double lip, whose synchronous operation of the two sealing lips is problematic. The technical solution according to this invention in fact simplifies the known embodiments as it uses just one metal seal against the movable element, the valve stem, and thanks to the particular conformation of the metal gasket 4, and in particular of its shaped edge 46, a second static seal is more than sufficient for a simple elastomeric sealing ring.

The sealing device 1 of the stem of the valve 12 of the present invention can also comprise an anti-rotation pin 9, which is fixed to the plate 5 and to the lower valve body 14. The anti-rotation pin 9 keeps the sealing device 1 in position and prevents the rotation of the same. The shape of the pin 9 is preferably cylindrical and advantageously, the pin 9 is positioned to one half within the lower valve body 14 and to the other half inside of the plate 5 of the gasket 4.

In addition to the embodiments of the invention, as previously described, it is to be understood that there are numerous further variants. It must also be understood that said embodiments are only exemplary and limit neither the subject of the invention nor its applications, nor its possible configurations. On the contrary, although the above description makes it possible to the skilled technician to implement the present invention at least according to one of its exemplary configuration, it should be understood that numerous variations are conceivable of the components described, without for this reason escaping from the subject of the invention, as defined in the appended claims, which are literally interpreted and/or according to their legal equivalents.

The invention claimed is:

1. A sealing device (1) for a stem (12) of a valve (10) comprising:
   a metal gasket (4) for the valve (10) stem (12), shaped as an inverted U-shaped fork provided with a single sealing lip (44), which has a radially inner surface (442) and a radially outer surface (444), which is inclined with respect to a longitudinal axis of the valve (10),
   a wedge metal ring (6) positioned inside the inverted U-shaped fork of the metal gasket (4),
   a spring (7) configured to generate a pressure on said wedge metal ring (6),
   a static sealing ring (8) made of a C-shaped metal;
   wherein said spring (7) is configured for applying a force to the wedge metal ring (6) such that said wedge metal ring (6)

applies a contact pressure to the single sealing lip (44) of the metal gasket (4), which is shaped as an inverted U-shaped fork; wherein said single sealing lip (44) is forming a first branch of the metal gasket (4);

and wherein said metal gasket (4) is further provided with a base portion (42) and a shaped edge (46) forming a second branch of the inverted U-shaped fork, while a portion (464) of said shaped edge extends in a radially outer direction with respect to the stem (12) of the valve (10); and wherein said second branch (462) of the inverted U-shaped fork is further away from the stem (12) of the valve (10);

and wherein said static sealing ring (8) is configured to be held into position by the shaped edge (46) of the metal gasket (4) in contact with the stem (12) of the valve (10), generating an additional static sealing surface against fluids.

2. The sealing device (1) according to claim 1, wherein said sealing lip (44) is configured so that when exposed to the contact pressure generated from the wedge metal ring (6), the sealing lip (44) rotates in a radially inner direction to create a tight seal surface on the stem (12) of the valve (10).

3. The sealing device (1) according to claim 1, wherein said wedge metal ring (6) is housed inside the inverted U-shaped fork of the metal gasket (4), between the sealing lip (44) and the shaped edge (46).

4. The sealing device (1) according to claim 1, wherein said wedge metal ring (6) has one surface (62) facing toward the stem (12), in contact against the radially outer surface (444) of the sealing lip (44); wherein said one surface (62) is inclined with respect to the longitudinal axis of the valve.

5. The sealing device (1) according claim 1, wherein said spring (7) is positioned axially between the wedge metal ring (6) and a seat (52) of a plate (5).

6. The sealing device (1) according to claim 5, wherein said spring (7) is selected from the group consisting of a helical spring and a "Belleville" spring.

7. The sealing device (1) according to claim 1 further comprising an anti-rotation pin (9) configured to connect a plate (5) of the sealing device (1) to a lower valve body (14); and wherein said anti-rotation pin (9) keeps the sealing device (1) in position and prevents its rotation; and wherein said anti-rotation pin (9) is positioned to one half within the lower valve body (14) and to the other half inside of the plate (5) of the sealing device (1).

8. A valve (10) comprising a mobile and metal stem (12) that rotates, or can slide along its axis within a lower valve body (14) and an upper valve body (16), wherein said valve (10) includes a sealing device (1) according to claim 1.

9. The valve (10) according to claim 8, wherein said mobile and metal stem (12) has said metal gasket (4) positioned in a radial direction between a radially outer surface (120) of the stem (12) of the valve (10) and a radially inner surface (140) of the lower valve body (14).

10. The valve (10) according to claim 8, wherein said mobile and metal stem (12) has said metal gasket (4) positioned in the axial direction between the lower valve body (14) and a plate (5) of the sealing device (1).

11. The valve (10) according to claim 8, further comprising hydraulic or pneumatic actuating means (18, 20) mounted on the upper valve body (16) and the lower valve body (14) to provide valve stem actuation.

12. The sealing device (1) according to claim 1, wherein said single sealing lip (44) is coated on the radially inner surface (442) with an alloy coating selected from the group consisting of tungsten carbides and chromium carbides using a coating method selected from the group consisting of PVD (Physical Vapor Deposition) and CVD (Chemical Vapor Deposition) coating.

13. The sealing device (1) according to claim 1, wherein said wedge metal ring (6) is made of high mechanical and corrosion resistance metal alloys, selected from the group consisting of stainless steels, alloys based on nickel, and titanium.

14. The sealing device (1) according to claim 1, wherein said spring (7) is of a "Belleville" type and is made of corrosion-resistant metal alloys.

* * * * *